Patented Jan. 21, 1930

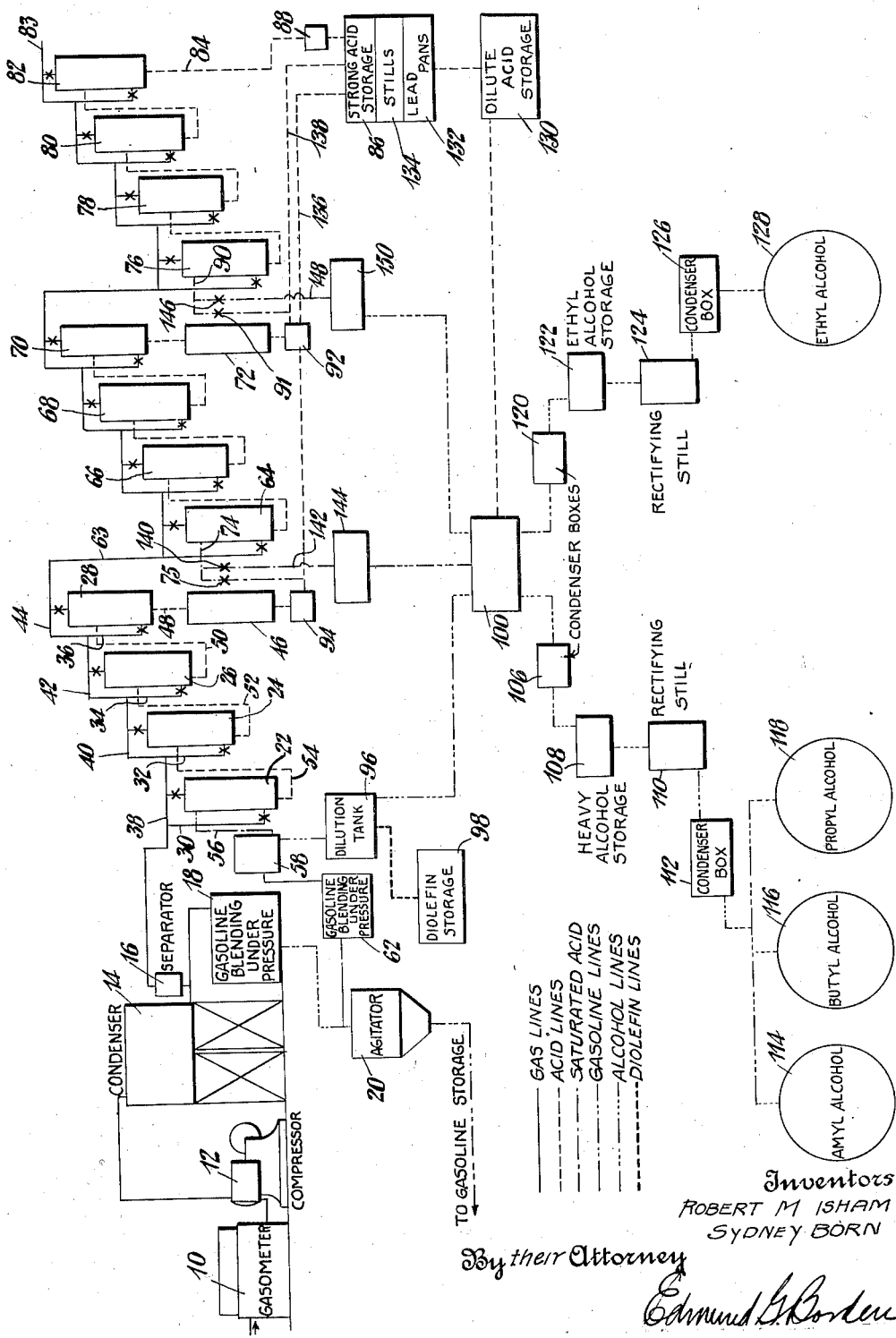

1,744,164

UNITED STATES PATENT OFFICE

ROBERT M. ISHAM, OF OKMULGEE, AND SIDNEY BORN, OF TULSA, OKLAHOMA, ASSIGNORS, BY MESNE ASSIGNMENTS, TO SETH B. HUNT, TRUSTEE, OF MOUNT KISCO, NEW YORK

PROCESS OF PRODUCING ALKYL SULPHATES

Original application filed May 1, 1919, Serial No. 294,013. Divided and this application filed August 7, 1926, Serial No. 127,948. Renewed May 27, 1929.

This invention relates to a process of producing alcohols and mixtures of alcohols from hydrocarbons.

Various processes have been proposed for the recovery of alcohols from gases formed in the decomposition of hydrocarbon materials. When the object is to produce ethyl alcohol the gases are first thoroughly purified to remove the higher olefines and the purified gas is treated to produce the alcohol. When the object is to produce the higher alcohols the gases are dissolved directly in sulphuric acid and the resulting material treated to recover the alcohols. These processes have the disadvantage that the higher olefines contained in the gas are polymerized by this treatment with the result that the yield of alcohol is materially reduced and that the polymerization products cause difficulties in the later steps of the process.

The present application is a division of our copending application for "process of producing alcohols", Ser. No. 294,013 filed May 1, 1919.

It is an object of the present invention to provide a process in which a high yield of alcohol is obtained from oil gases without polymerization of the higher olefines.

It is a further object of the invention to provide a process in which the olefines are selectively absorbed to yield different alcohols from the complex mixtures of olefines obtained from oils.

With these and other objects in view the invention consists in the process of making alcohols hereinafter described and claimed.

In the accompanying drawings is shown a diagrammatic illustration of an apparatus in which the various steps of the process of making alcohols from oil gases may be carried on.

Oil gases suitable for use in the process may be obtained by cracking petroleum, petroleum residues or other hydrocarbon oils to produce lower hydrocarbons. The cracking of petroleum or other hydrocarbon oils may be carried on in a vacuum, at atmospheric pressure or under greater than atmospheric pressure. It has been found that the gases evolved on cracking oils at low pressures contain large amounts of ethylene and also considerable amounts of higher olefines, such as amylenes and butylenes. The gases evolved on cracking petroleums under higher pressures contain large amounts of butylenes and amylenes with small admixtures of other olefines.

To obtain alcohols from oil gases in accordance with the preferred form of the invention, the gases from a cracking retort are first compressed and cooled. A small amount of water and some hydrocarbon vapors will be condensed at this point in the process and these are removed to be blended with gasoline. The cooled and compressed gases containing the olefines are then led into the first of a series of absorbing units. Here they come in contact with sulphuric acid cooled to a temperature of about $-25°$ C., which acid contains sulphuric acid esters of lower alcohols formed by the absorption of olefines at a later stage in the process. In this unit the higher olefines, such as amylenes and butylenes, are absorbed to form esters of the corresponding alcohols. From the first absorbing unit the gases pass to a second absorbing unit in which the lower olefines, such as propylene, are absorbed to form the corresponding esters. The sulphuric acid in the second unit is at a higher temperature and contains esters of still lower alcohols obtained in a later absorption unit. From the second absorbing unit the gases, which now contain only the lowest members of the olefines, pass to the final absorbing unit where they come in contact with concentrated sulphuric acid maintained at a higher temperature than the temperature of the second unit. Here the ethylene is absorbed to form ethyl sulphuric acid. The sulphuric acid is passed from the final to the first absorption unit counter to the current of gas. The esters obtained in the above manner may then be hydrolyzed and distilled to obtain the corresponding alcohols.

In the drawings is illustrated a diagrammatic apparatus or flow sheet in which the preferred process of the invention may be carried out as follows:

Oil gases from a gasometer, or other source 10, flow to a compressor 12, where they are compressed to a pressure of from 50 to 200 pounds per square inch. The compressed gases then pass through a condenser 14 where they are cooled to such a temperature that part of the water and some hydrocarbon vapors are condensed. These gases then pass into a separator 16, where entrained liquid particles are separated therefrom. The liquid from the separator 16 is then passed to a gasoline blending apparatus 18 and agitator 20, and from thence to storage.

The gases leaving the separator 16 pass to the first absorber 22 of an absorbing unit 22, 24, 26 and 28. These absorbers 22—28 may be of any standard type capable of being cooled to the desired temperature and of bringing the olefines in the gases into intimate contact with an absorbing acid solution. The gas enters the first absorber 22 of the unit by a pipe 30 and passes from this absorber to the second absorber 24 by a pipe 32. It then passes in a similar manner to the absorbers 26 and 28 by means of pipes 34 and 36. By-pass pipes 38, 40, 42 and 44 are provided whereby any of the absorbers 22—28 may be cut out of the unit. In the piping arrangement, suitable valves (indicated as crosses on the pipes) are provided to obtain the desired circulation of gas and liquids. The acid which is used to absorb the olefines passes from a cooler 46 in a reverse direction to the direction of the flow of the gases through absorbers 28, 26, 24 and 22 by means of the respective pipes 48, 50, 52 and 54, and leaves the unit thru a pipe 56. Each of the absorbers 22—28 is maintained at a temperature of about −25° C. at which temperature the amylenes and butylenes are selectively absorbed from the mixture of gasses to form the corresponding esters.

When a mixture of olefines, such as exists in oil gases, is brought directly into contact with sulphuric acid at the usual atmospheric temperatures, the greater part of the higher olefines, the butylenes, amylenes and hexylenes, are polymerized and do not form the esters of the acid. This polymerization causes a decreased yield of higher alcohols, particularly of secondary and tertiary amyl and butyl alcohols, and also produces substances which interfere with the separation of diolefins in the dilution tank. We have discovered that when a very low temperature, that is a temperature of about −25° C. is employed while carrying out the absorption under pressure, this polymerization is very much reduced. At these lower temperatures, moreover, the lighter olefines, the propylenes and ethylenes, are not appreciably absorbed. By using these low temperatures, therefore, the higher olefines may be selectively absorbed and a much higher yield of the higher alcohols may be obtained. With some oil gases the higher olefines may be effectively esterified at temperatures as high as −5° C., but with gas containing a higher percentage of higher olefines the lower temperatures are preferred.

We have, moreover, found that the polymerization of the higher olefines may be reduced to a negligible amount if the sulphuric acid used contains lower olefines which are present in the form of the sulphuric esters of lower olefines. Therefore, we use as an absorbing medium, sulphuric acid which has been used as an absorbent for the lower olefines in later steps of the process, and which has become diluted thereby. However, with certain types of gases, sulphuric acid which does not contain lower olefines may be used without forming a prohibitive amount of polymerization products. In this case fresh sulphuric acid may be supplied at the proper temperatures to each stage of the absorbing operation.

From the first absorbing unit the gases, now freed from the higher olefines, pass thru a pipe 63 to absorber 64 of a second absorbing unit 64, 66, 68 and 70, which has a construction and piping arrangement similar to the construction and piping arrangement of the first absorbing unit. The gases pass consecutively thru absorbers 64, 66, 68 and 70 in the same manner as in the first absorbing unit. In the absorbers 64—70 the gases come in contact with sulphuric acid which is supplied from a cooler 72 and flows thru the absorbers counter-current to the flow of gas. A temperature of from 10° to 20° C. is maintained in these absorbers at which temperatures the propylene is selectively absorbed from the gases passing thru the unit. The propylene is more completely and readily absorbed without polymerization at these higher temperatures, particularly when the amylenes and butylenes have been previously removed. Ethylene, which is not readily absorbed at this temperature, passes out of the unit with the gases leaving absorber 70.

From the second absorbing unit the gases, which now contain practically no olefines except ethylene, pass through the third absorbing unit consisting of absorbers 76, 78, 80, and 82. These absorbers have a construction and piping arrangement similar to the construction and piping arrangement of the absorbers of the first and second units. Concentrated sulphuric acid is introduced into the third absorbing unit thru a pipe 84 and flows thru the unit counter-current to the flow of gas. A temperature of approximately 90° C. is maintained in the third absorbing unit, at which temperature the ethylene is readily absorbed with the formation of ethyl sulphuric acid. The unabsorbed gases then pass from the apparatus thru pipe 83, and may be conducted to storage or to a furnace to be burned.

The course of the acid, in the absorption system, is as follows:

Concentrated sulphuric acid, of 1.84 specific gravity, is taken from the storage tank 86 by a pump 88 and forced through the pipe 84 to absorber 82 of the final absorption unit. The acid then flows, by gravity, successively through the units 82, 80, 78 and 76 and through a pipe 90 and valve 91 to the pump 92. Pump 92 forces the acid liquor through the cooler 72 to the last absorber 70 of second absorbing unit, and it then flows through the absorbers 70, 68, 66 and 64 and through pipe 74 and valve 75 to a pump 94. The pump 94 forces the acid through the cooler 46 and through the first absorption unit. Coolers 46 and 72 may form a part of the corresponding absorption units 22—28 and 64—70, or in case sufficient cooling effect can be obtained in the absorbers themselves these preliminary coolers 46 and 72 may be omitted entirely. The acid liquor flows from the absorber 22 of the first absorption unit to the separator 58 where the unabsorbed condensate is removed. The acid liquor, which has become diluted by the absorbed olefines and moisture not removed from the gases and which now has a specific gravity of about 0.95, passes to a dilution tank 96 and the unabsorbed condensate passes to the gasoline blending apparatus 62 and agitator 20.

In the dilution tank 96, the acid liquor is diluted with approximately three volumes of water for each volume of acid originally supplied to the absorber whereupon any olefines which may have been polymerized during the process separate out and are removed to a diolefine tank 98. From the dilution tank the dilute acid liquors flow to a still 100, where the mixtures of the esters are hydrolyzed and distilled. The heavier alcohol vapors from the still 100 are collected in a condenser box 106 and drawn off to a storage tank 108. The alcohol is then taken to a rectifying still 110, where the vapors are selectively separated and condensed in the condenser 112, and run into storage tanks 114, 116 and 118 (for amyl, butyl and propyl alcohols respectively). The ethyl alcohol is condensed in a condenser 120 and stored in a tank 122 or rectified in a still 124. The vapors from the still 124 are condensed in a condenser 126 and the finished product stored in a tank 128. The dilute acid remaining after distillation in the still 100 is drawn off to a dilute acid storage tank 130. This acid may be brought to the lead pans 132 and still 134 to be concentrated and then returned to the tank 86 to re-enter the process. If desired, the condensates from the condenser boxes 112 and 126 may be passed through calcium chloride driers to be dehydrated before they are sent to the storage tanks 114, 116, 118 and 128.

When it is desired to produce separate solutions of the various alkyl sulphates in the different absorbing units, acid from the storage tank 86 is separately circulated through each of the absorption units. The acid to be used for absorbing the higher olefines, such as amylene and butylene in the first absorbing unit is then taken directly from the storage tank 86, or other source, by the pump 94 through a pipe 136 and forced directly through the cooler 46 and first absorption unit 22—28. The liquid leaving the absorbing unit 22—28 then contains only esters of amylene and butylene and is passed to the separator 58 and dilution tank 96, as described above. The liquid is then separately treated in the stills 100 and 110 to recover amyl and butyl alcohols. The acid to be used in the second absorption unit 64—70, for separately recovering the propylene, is taken by the pump 92 directly from the storage tank 86 through a pipe 138 and forced through the cooler 72 to the second absorption unit. The acid containing propyl esters is then removed from the absorber 64 of the unit 64—70 through a valve 140 and pipe 142. The acid solution is then hydrolyzed in the tank 144 and then separately treated in stills 100 and 110 to recover propyl alcohol. The acid to be used in the third absorption unit 76—82, for separately recovering the ethylene is taken by the pump 88 directly from the storage tank 86 through a pipe 84 and forced to the third absorption unit. The acid containing the ethyl esters is then removed from absorber 76 of the unit 76—82 through a valve 146 and pipe 148 to a dilution tank 150. The acid solution is then hydrolyzed in the tank 150 and is then separately treated in stills 100 and 110 to recover the ethyl alcohol.

The absorption of the olefines in all of the absorption units is carried out under pressure to assist in an effective selective absorption and to provide a minimum polymerization of the olefines. The oil gas is placed under pressure by the compressor 12 and the acid is placed under pressure by the pumps 88, 92 and 94 In accordance with the gas being treated and the type of esters being formed, a pressure of from 50 to 200 pounds per square inch is maintained in the absorbing units.

The use of separate portions of sulphuric acid in each of the absorbing units has the advantage of forming separate solution of the esters, and may be used with some types of gases without substantial losses by polymerization.

With the above process the most complex mixtures of gases can be treated so as to selectively absorb the various olefines under those conditions which are most suitable for the absorption of each individual olefine. Moreover, the process can be so manipulated as to produce a mixture of esters with a minimum of polymerization products.

The above detailed description of the process is merely given by way of example as one embodiment which has given excellent results in practice. It is evident that modifications may be introduced in some of the steps of the process, that the types and numbers of absorbers may be varied to suit different types of gases and that the treatment of the products obtained in different steps may be varied without departing from the fundamental features of the invention.

In making mixtures of alkyl sulphates the proper temperature conditions may in some cases be maintained in using less than three absorbing units and it may then be of advantage to use two units. While the process has been described as carried out in stages in separate absorbing units as this method appears to permit of better temperature control, this may be varied by not dividing the absorbers in separate units and by passing the gas and acid counter current to each other and gradually and continuously increasing the temperature in the direction in which the gas flows.

We claim:

1. The process of making alkyl sulphates from gases containing butylene, propylene and ethylene which comprises treating the gases in three successive stages or steps with sulphuric acid, the first two stages being conducted at temperatures adapted for the absorption of butylene and propylene respectively and the last stage at a temperature adapted for the absorption of ethylene, to separately absorb the several olefines substantially in the order of chemical affinity, whereby alkyl sulphates corresponding to the several olefines are separately produced.

2. The porcess of making alkyl sulphates from gases containing butylene, propylene and ethylene which comprises passing the gases successively through a series of absorbing chambers containing sulphuric acid under varying temperature conditions such that the olefines are absorbed substantially in order of chemical affinity and under conditions most suitable for the fixation of the respective olefines, the temperature of the propylene absorbing chambers being under about 20° C. and that of the ethylene absorbing chambers being appoximately 90° C. whereby alkyl sulphates corresponding to the several olefines are separately produced.

3. The process of making alkyl sulphates from olefine-containing gases, comprising treating the gases in successive stages with sulphuric acid at successively increased temperatures, the temperature at each stage being such as to promote the selective absorption of the olefines from said gases, and separately removing the olefines absorbed in each stage.

4. The process of making alkyl sulphates from material containing butylene, propylene and ethylene, comprising contacting said material with sulphuric acid in successive stages at progressively increasing temperatures, the temperature at successive stages being adapted to promote the selective absorption of the butylene, propylene and ethylene respectively and separately removing the absorbed materials from each stage.

5. The process of making alkyl sulphate from olefine-containing gases which comprises passing the gases in succession through a series of connected absorbing chambers arranged in groups severally containing sulphuric acid at temperatures most suitable to the fixation of respective olefines in the order of their chemical affinity and separately collecting the alkyl sulphates formed in the respective groups of chambers corresponding to the several olefines selectively absorbed from the gases.

6. The process of making alkyl sulphates from gases containing butylene and propylene which comprises passing the gases through a plurality of series-connected chambers, contacting gases in certain of said chambers with sulphuric acid of a temperature adapted for the absorption of the butylene and subsequently contacting the gases in other chambers with sulphuric acid of a temperature adapted for the absorption of the propylene whereby corresponding alkyl sulphates are separately produced.

7. The process of making alkyl sulphates from olefine-containing gases comprising contacting said gases with sulphuric acid in a plurality of interconnecting chambers divided into a plurality of operating groups, introducing fresh sulphuric acid into a chamber of each group, maintaining in each group a temperature adapted to promote the selective absorption of an individual olefin from said gases, and separately withdrawing the absorbed products from each group.

8. In the process of making alcohols from olefin containing hydrocarbons, passing sulphuric acid in parallel through a plurality of groups of absorbing chambers, passing the hydrocarbons to be treated in series through the chambers of each group, maintaining each group of chambers at a temperature adapted to promote the selective absorption of a desired olefin from said hydrocarbons, and separately removing the absorbed products from each group of absorbing chambers.

9. In the process of making alcohols from oil gases containing olefins, passing sulphuric acid in parallel through a plurality of absorbing zones, passing the oil gases to be treated in series through said zones, and maintaining said zones at successively higher temperatures, the last zone of said series being maintained at approximately 90° C.

10. The process as defined in claim 9 in which the first absorbing zone is maintained at a temperature of about −25° C.

11. The process as defined in claim 9 in which an intermediate zone is maintained by regulated cooling at a temperature of from 10° to 20° C.

12. The process of making acid aykyl sulphates from gases containing butylenes and propylene which comprises passing the gases through a plurality of series-connected chambers, contacting the gases in certain of said chambers with sulphuric acid of a concentration and temperature adapted for the absorption of the butylenes, and subsequently contacting the gases in other chambers with sulphuric acid of a concentration and temperature adapted for the absorption of the propylene whereby corresponding acid alkyl sulphates are separately produced.

13. The process of making alkyl sulphates from hydrocarbon material containing olefins, which comprises passing sulphuric acid in parallel through a plurality of absorbing zones, passing the hydrocarbon material to be treated in series through said zones, maintaining each zone at a temperature adapted to promote the selective absorption of a desired olefin from said hydrocarbon material, maintaining a superatmospheric pressure on the materials undergoing absorption in said zones, and separately removing the absorbed products from each zone.

14. The process of making alkyl sulphates from hydrocarbon material containing olefins, which comprises introducing fresh sulphuric acid into each of a series of zones maintained at successively higher temperatures, introducing the hydrocarbon material to be treated into the lowest temperature zone of the series and passing the unabsorbed material from said zone successively into the remaining zones of the series, bringing the hydrocarbon material introduced into each zone into intimate contact with the sulphuric acid therein, maintaining a superatmospheric pressure on the materials in each zone, and maintaining a temperature adapted to promote the selective absorption of desired olefin constituents from said material, and separately removing the absorbed olefin from each zone.

15. The process of selectively absorbing olefin from hydrocarbon material containing olefins, which comprises introducing the hydrocarbon material to be treated into an absorbing zone in direct contact with sulphuric acid, maintaining a temperature below about −5° C. in said zone thereby to absorb the higher olefins in said material, passing the unabsorbed material from said zone into a second absorbing zone maintained at a higher temperature than said first mentioned zone but below a temperature of about 20° C., and in which the hydrocarbon material is brought into intimate contact with sulphuric acid, maintaining the materials in each zone under a pressure of from fifty to two hundred pounds per square inch, and separately recovering the absorbed materials from each zone.

16. The process of selectively absorbing olefins from hydrocarbon material containing olefins, which comprises introducing the hydrocarbon material to be treated into an absorbing zone in direct contact with sulphuric acid, maintaining a temperature below about −5° C. in said zone thereby to absorb the higher olefins in said material, passing the unabsorbed material from said zone into succeeding zones maintained at successively higher temperatures and in which the hydrocarbon material is brought into intimate contact with sulphuric acid, maintaining the materials in each zone under a pressure in excess of about fifty pounds per square inch, and separately removing materials absorbed in each zone.

17. The process of treating olefin-containing hydrocarbon material in the gaseous state, which comprises bringing the material into intimate contact with cold sulphuric acid in a contact zone in which a temperature below about −5° C. is maintained, removing absorbed and liquefied materials from said zone, and separating the liquid unabsorbed material from the acid and absorbed material, passing gaseous unabsorbed material from said zone into a second absorbing zone in contact with sulphuric acid maintained at a higher temperature, and separately recovering the absorbed material from said second zone.

ROBERT M. ISHAM.
SIDNEY BORN.